G. L. SCHOFIELD.
STEERING DEVICE FOR AUTOMOBILES.
APPLICATION FILED APR. 8, 1915.
1,175,475.
Patented Mar. 14, 1916.
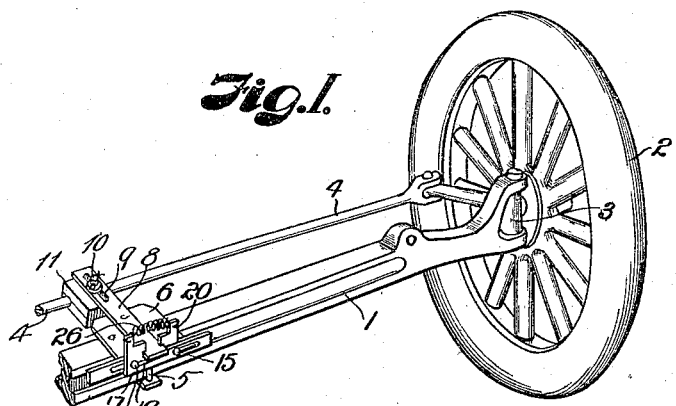
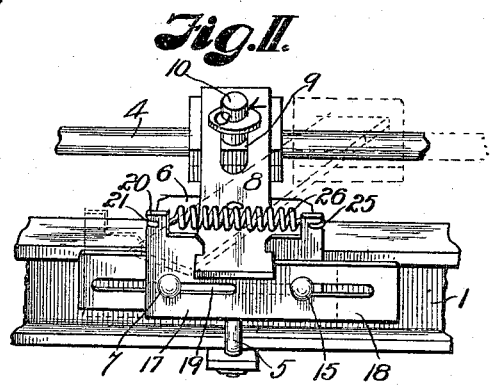
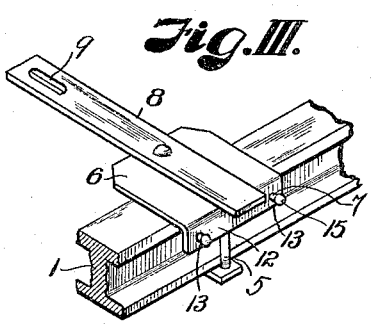
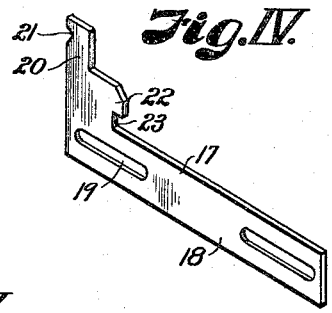
WITNESSES:
INVENTOR
G. L. Schofield.
ATTORNEY

UNITED STATES PATENT OFFICE.

GEORGE L. SCHOFIELD, OF KANSAS CITY, MISSOURI.

STEERING DEVICE FOR AUTOMOBILES.

1,175,475. Specification of Letters Patent. Patented Mar. 14, 1916.

Application filed April 8, 1915. Serial No. 19,900.

*To all whom it may concern:*

Be it known that I, GEORGE L. SCHOFIELD, a citizen of the United States, residing at Kansas City, in the county of Jackson and State of Missouri, have invented certain new and useful Improvements in Steering Devices for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a steering device for automobiles, and has for its principal object to provide a device of this character for retarding the lateral movement of the steering wheels of an automobile caused by obstructions in the road bed or carelessness on the part of the driver, and for automatically bringing the wheels back to a neutral position.

In accomplishing this object I have provided the details of structure hereinafter described and illustrated in the accompanying drawings, wherein:—

Figure I is a perspective view of a steering device constructed in accordance with my invention, showing the manner of mounting the device on the axle of an ordinary automobile, and its connection with the steering parts. Fig. II is a front perspective view of the device. Fig. III is a perspective view of the base plate and steering arm. Fig. IV is a detail perspective of one of the slidable front plates. Fig. V is a central longitudinal section of the device.

Referring more in detail to the drawings:—1 designates the front axle, 2 the ground wheels, 3 a steering knuckle and 4 the knuckle connecting rod of an ordinary automobile. Rigidly mounted on the axle 1, preferably by bolts 5, is a flat base plate 6 the front end of which is turned down over the front edge of the axle and carries the spaced pins 7, while the rear end is projected to form a substantial bearing face. Pivotally mounted on the plate 6 is a horizontal lever 8 having a rearwardly extended portion which overlies the knuckle connecting rod 4 and has a slot 9 for receiving a pin 10 that projects upwardly from a clamp 11 that is secured to the rod 4. Slidably mounted on the shanks 13 of the pins 7 and retained thereon by the heads 15 are plates 17, each of which comprises a long and relatively narrow portion 18 provided with two horizontally alining slots 19 for receiving said pins and having upwardly extended end standards 20, each having an outwardly opening notch 21 and an inner shoulder 22 provided with an inwardly opening recess 23 for receiving the forwardly extended part of the guide lever 8. The plates 17, two in number, are oppositely placed, one overlying the other on the rivet shanks, and are limited in the slidable movement which is determined by the length of the slots 19. Seated within the notches 21 of the standards 20 are the end hooks 25 of a coil spring 26; the said spring serving to yieldingly retain the slide plates at their inner position and to automatically bring the same back to this position after they have been forced outwardly either by the manipulation of the steering parts or by unevenness of the road.

Presuming the parts to be constructed and assembled as described, the device is secured to the axle, as shown, and the steering wheels turned to a neutral position. The clamp 11 is then tightened on the steering rod 4 with the pin 10 projected upwardly through the slot 9 of the arm 8. It will be seen that as the wheels are deflected from one direction to another, the pivotally mounted arm 8 causes a like shifting of one of the plates 17, which is yieldingly held by the spring 26, and as the pressure is removed from the steering mechanism the said spring will draw the parts back to a neutral position.

Having thus described my invention, what I claim as new therein and desire to secure by Letters-Patent, is:—

1. The combination with an axle and connecting rod, of a lever pivotally mounted on one of the members and having slidable connection with the other member, movable standards engaging opposite edges of the lever at the side of the pivot opposite the sliding connection, and yielding means connecting the standards, whereby movement of the lever will move a standard against the tension of said yielding means.

2. The combination with an axle and connecting rod, of a lever pivotally mounted on one of the members and having slidable connection with the other member, movable standards engaging opposite edges of the lever at the side of the pivot opposite the sliding connection, yielding means connecting the standards, whereby movement of the lever will move a standard against the tension of said yielding means, and means for limiting the movement of said standards.

3. The combination with an axle and connecting rod, of a lever pivotally mounted on the axle and having longitudinal sliding connection with the connecting rod, standards slidably mounted on the axle, and adapted for engagement with opposite sides of said lever, means for limiting the sliding movement of the standards, and yielding means connecting the standards.

4. The combination with an axle and connecting rod, of a clamp on the connecting rod having an upstanding pin, a lever pivotally mounted on the axle and having a slotted portion engaging the pin, standards slidably mounted on the axle and arranged to engage opposite sides of the lever, means for limiting travel of said standards, and a spring connecting the standards and urging the same toward the lever.

5. The combination with an axle and connecting rod, of a lever pivotally mounted on the axle and projecting forwardly and back therefrom, standards slidably mounted on the axle at opposite sides of the lever and having pin and slot connection with the axle, a spring connecting the standards to urge the same toward the lever, and means anchoring the back portion of the lever, to said connecting rod.

6. The combination with an axle and connecting rod, of a lever pivotally mounted on the axle and having a forward end projecting forwardly from the axle and a rear end overlying the connecting rod, standards having slotted portions overlying the axle and post members lying on opposite sides of the front end of the lever, pins projecting through the standard slots into the axle, a spring connecting said posts, and means attaching the rear end of said lever to said connecting rod.

7. The combination with an axle, of a bearing plate on the axle, a lever pivotally mounted on the bearing plate and having a slotted rear end overlying the connecting bar, standards having slotted portions overlying each other at the front of the axle, and having guide portions lying on opposite sides of the lever, pins extending through the standard slots into the axle, and a spring connecting the guide members of said standards, for the purpose set forth.

In testimony whereof I affix my signature in presence of two witnesses.

GEORGE L. SCHOFIELD.

Witnesses:
LYNN W. ROBINSON,
LETA E. COATS.